United States Patent [19]

Hostettler

[11] Patent Number: 4,797,226

[45] Date of Patent: Jan. 10, 1989

[54] LOW TEMPERATURE, COMPATIBLE MIXTURES OF POLYETHER PREPOLYMERS AND FLOW MODIFIERS

[76] Inventor: Fritz Hostettler, 200 Springhill Rd., Skillman, N.J. 08558

[21] Appl. No.: 48,455

[22] Filed: May 5, 1987

Related U.S. Application Data

[63] Continuation of Ser. No. 779,312, Sep. 24, 1985, abandoned, which is a continuation of Ser. No. 508,192, Jun. 27, 1983, abandoned.

[51] Int. Cl.$^4$ .......................... C09K 3/00; H05B 33/00
[52] U.S. Cl. ................................................... 252/182.2
[58] Field of Search ........................................ 252/182

[56] References Cited

U.S. PATENT DOCUMENTS

| | | | |
|---|---|---|---|
| 3,169,945 | 2/1965 | Hostettler | 528/355 |
| 3,502,601 | 3/1970 | Case et al. | 521/171 |
| 3,644,457 | 2/1972 | Konig et al. | 521/159 |
| 3,666,724 | 5/1972 | Hostettler | 528/80 |
| 3,956,221 | 5/1976 | Olstowski et al. | 524/759 |
| 3,957,753 | 5/1976 | Hostettler | 560/189 |
| 3,965,073 | 6/1976 | Olstowski et al. | 524/48 |
| 4,000,105 | 12/1976 | Olstowski et al. | 524/772 |
| 4,076,660 | 2/1978 | Olstowski et al. | 524/764 |
| 4,115,429 | 9/1978 | Reiff et al. | 521/159 |
| 4,118,411 | 10/1978 | Reiff et al. | 260/453 AH |
| 4,189,544 | 2/1980 | Thompson | 528/90 |
| 4,287,307 | 9/1981 | Hostettler | 521/51 |
| 4,334,032 | 6/1982 | Patton et al. | 521/115 |
| 4,334,052 | 6/1982 | Patton et al. | 528/52 |
| 4,469,616 | 9/1984 | Hostettler | 252/182 |

*Primary Examiner*—A. Lionel Clingman
*Attorney, Agent, or Firm*—Vincent P. Pirri

[57] ABSTRACT

There are provided low temperature, storage stable, liquid mixtures of (1) isocyanato-containing prepolymers obtained from the reaction of linear and/or slightly branched polyetherpolyols and a polyisocyanate characterized by a methylene group $-(CH_2)-$ bonded to two benzenoid nuclei, and (2) a non-hydroxyl-containing flow modifier which is compatible with the said prepolymer. Novel liquid mixtures thus prepared exhibit little tendency to crystallize or phase separate when stored for prolonged periods of time, i.e., well below room temperature for several days.

31 Claims, No Drawings

LOW TEMPERATURE, COMPATIBLE MIXTURES OF POLYETHER PREPOLYMERS AND FLOW MODIFIERS

This is a continuation of co-pending application Ser. No. 779,312, filed on Sept. 24, 1985, abandoned, which is a continuation of application Ser. No. 508,192, filed on June 27, 1983, abandoned.

BACKGROUND OF THE INVENTION

It is well recognized that polyisocyanates which are liquid at room temperature have obvious processing advantages over solid polyisocyanates; see for instance U.S. Pat. No. 4,115,429. Polyisocyanates such as the commercially available and widely used toluene diisocyanate (TDI) and 1,6-hexamethylene diisocyanate are potentially harmful due to their relatively high vapor pressure and accordingly, certain safety precautions are employed to minimize harmful physiological effects. For this reason, various attempts have been made, either to start with diisocyanates that are normally liquid at room temperature and to reduce their physiological effects by certain procedures or to start with diisocyanates that are solid at room temperature and to convert these into liquid form. In both cases, however, one usually obtains either isocyanates of higher valency, i.e., tri- or higher polyisocyanates or higher molecular weight diisocyanates or a combination of these effects.

Important diisocyanates which are solid at room temperature and which are readily available on a large commercial scale are 4,4'-diphenylmethane diisocyanate and the 2,4'-isomer thereof which melt at 39° C. and 34.5° C., respectively. Attempts have already been made to liquefy both the 4,4'-diphenylmethane diisocyanate and a mixture of the 4,4'-diphenylmethane diisocyanate and a small amount of the 2,4'-isomer. Thus, for example in U.S. Pat. No. 3,644,457, 1 mol of a diphenylmethane diisocyanate is reacted with from about 0.1 to about 0.3 mol of poly-1,2-propylene ether glycol. While the products made according to this patent have met with commercial success, they still suffer from a serious drawback. Specifically, it has been found that these adducts generally will crystallize anywhere from 5° C. to as high as 25° C. In fact, when supplied in commercial quantities, these adducts are generally transported in heated trucks. Additionally, in order to thaw the materials it is generally necessary to heat them to somewhere in excess of 50° to 60° C. While in warmer climates there may not be any problem, in colder areas where the product may be stored in tanks over a period of time, this tendency to crystallize can become a very serious problem. Similar attempts to form liquid diphenylmethane diisocyanates have been described, for example, in U.S. Pat. Nos. 3,384,653 and 3,394,164. The attempts to liquefy in both of these instances were based on the addition of, in one case, a trihydrocarbyl phosphate, and, in the other case, small amounts of phosphoric acid. In any event, the storage stability of both of these types of products is again quite good around room temperature, but as the temperature decreases, both types of materials tend to crystallize.

Isocyanato-terminated prepolymers of about 600 to about 4500 molecular weight, e.g., prepared from the reaction of an excess of 4,4'-diphenylmethane diisocyanate (MDI) with (i) linear or slightly branched polyesterdiols with/without polyestertriols (reaction products of lower aliphatic glycols with/without small amounts of glycerol and alkanedicarboxylic acids), or (ii) dipropylene glycol, comprise products generally having melting points of about 10° C. to about 30° C., and higher, depending primarily on the amount and structure of the polyol employed. Quasi-prepolymers containing, by weight, from about 50% to about 60% of the polyol segment (e.g., a polyol from adipic acid, ethylene glycol, 1,4-butandiol) are generally liquid products at room temperature. When the MDI content is increased to about 60%, or more, the resulting quasi-prepolymers are often times crytalline products in the 15°-25° C. range. Quasi-prepolymers comprised of MDI and about 10-15% of the di- and/or tripropylene glycol(s) are often times crystalline at about 15° C.-20° C. In this state, the quasi-prepolymers are more difficult to process, exhibit greater tendency towards dimerization and trimerization reactions, and detract from optimal physical characteristics of the end polyurethane product.

SUMMARY OF THE INVENTION

It has now been found quite unexpectedly indeed that there can be prepared novel low temperature, storage stable, liquid mixtures of (1) isocyanato-containing prepolymers derived from the reaction of (i) a polyol and (ii) an organic polyisocyanate characterized by a methylene group bonded to two benzene nuclei as, for example, 4,4'-diphenylmethane diisocyanate, and (2) a non-hydroxyl-containing flow modifier, hereinafter developed in detail. The non-hydroxyl flow modifier is a normally-liquid compound and compatible with the prepolymer, or it may be a low melting solid which forms a normally-liquid, compatible mixture with the prepolymer. The addition of a few parts (by weight), e.g., about 3 parts of flow modifier to 100 parts (by weight) of prepolymer can result in compatible mixtures whose melting points are measurably lower than the prepolymer per se. In general, a practical commercial lower limit is approximately 5 parts flow modifier per 100 parts prepolymer. Thus in the practice of the invention, there can be prepared novel liquid compatible mixtures comprising prepolymer(s) and flow modifier(s) which exhibit storage stability for long periods of time at temperatures substantially below room temperature, for example, at about +5° C., and lower, for several days to several weeks, e.g., at least 100 hours, and longer. Many of the novel liquid mixtures exhibited compatibility, did not crystallize or phase separate, and remained chemically stable for at least one week (and upwards to several weeks) at temperatures at about 0° C., and lower. During these periods several of the novel mixtures were liquid, compatible, non-crystalline, and chemically stable at −5° C., and −10° C., and even below these temperatures. Thus, the novel mixtures can be transported over great distances and stored for prolonged periods of time at low temperature, and rmain in a compatible liquid state ready for the intended use. Handling and processing problems which are associated with polyisocyanate compounds crystallizing or melting in the 15° C. to 30° C. and higher range are substantially eliminated by using the novel mixtures described herein. Moreover, it has been observed that dimerization and trimerization reactions are greatly reduced. The novel storage stable liquid mixtures are readily cast or metered through pumps, and have very low vapor pressure and therefore are substantially physiologically harmless.

The novel liquid mixtures comprising prepolymer and non-hydroxyl flow modifier can be employed in the NCO/OH polyaddition reactions to prepare a wide variety of polyurethane products such as coatings, adhesives, foams, and elastomers. These novel mixtures have been found to be extremely useful and, indeed highly preferred for the preparation of homogeneous and cellular polyurethane products, especially microcellular products such as, for example, integral skin microcellular polyurethanes. Such products exhibit a broad spectrum of highly desirable and/or improved characteristics.

DETAILED DESCRIPTION OF THE INVENTION

It has now been found that a wide variety of non-hydroxyl-containing flow modifiers can be admixed with the prepolymers to form novel low temperature, storage stable, liquid mixtures. The flow modifier and prepolymer are compatible and soluble with each other forming a solution which does not phase separate for long periods of time at low temperatures. The flow modifier has a boiling point above about 150° C. and is normally-liquid, i.e., liquid at about 20° C., or is a relatively low melting solid which forms with the prepolymer a compatible, storage stable, low temperature liquid mixture. The flow modifier consists essentially of (a) carbon and hydrogen atoms preferably in the form of a monovalent and/or polyvalent hydrocarbon groups such as a $C_1$–$C_{18}$ acyclic group, a $C_5$–$C_7$ cycloaliphatic group including unsubstituted- and the mono and poly $C_1$–$C_4$ alkyl substituted- $C_5$–$C_7$ cycloalkyl, and/or a benzenoid ring nucleus, e.g., mono-, fused-, and bridged nuclei, including the partially or fully hydrogenated ring nuclei and the unsubstituted- and mono and poly $C_1$–$C_4$ alkyl substituted- counterparts thereof; (b) etheric oxygen in the form of oxyalkylene group(s); and (c) at least one group having the following structural configuration:

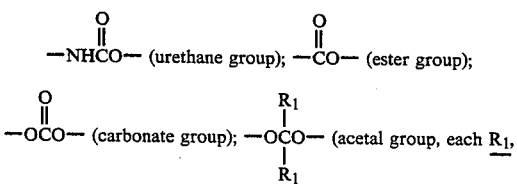

individually, being hydrogen or a monovalent hydrocarbon group); and —OR (hydrocarbyloxy group); each of the unsatisfied bonds of the above structural units being monovalently attached to separate carbon atoms of the flow modifier molecule. The term "oxyalkylene", as used herein, characterizes and oxy atom bonded to an acyclic or alicyclic carbon atom to form, as by way of illustrations, the unit

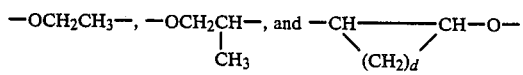

wherein d is an integer of from 3 to 6. Illustrative divalent oxyalkylene groups include oxyethylene, oxypropylene, oxytrimethylene, oxytetramethylene, chloromethyl-substituted oxethylene, phenyl-substituted oxyethylene, dimethyl-substituted oxyethylene, cyclohexleneoxy, cyclopentyleneoxy, and methyl-substituted cyclohexyleneoxy; the mixed oxyalkylenes of the above such as oxyethyleneoxypropylene, oxyethyleneoxybutylene, and oxypropyleneoxybutylene; mixed oxalkylenes which contain minor amounts of oxymethylene groups and the random and block oxyalkylenes of the foregoing; and the like. The flow modifiers contemplated in the practice of the invention are characterized by at least one oxyalkylene group and upwards to 25, and more, of such groups. In various embodiments a suitable upper limit is 8 oxyalkylene groups. Preferred flow modifiers are characterized by oxyethylene or oxypropylene group(s) or mixtures of such groups with/without minor amounts of other oxyalkylene group(s).

The average molecular weight of the flow modifiers which are employed in the preparation of the novel storage stable, liquid mixtures can vary over a wide range depending on the prepolymer component and the flow modifier of choice. Thus, the molecular weight can range from about 100 to a few thousand, e.g., approximately 3000, providing that the flow modifier satisfies the requirements stated previously, i.e., normally liquid material (or a low melting solid) which is compatible and soluble with the prepolymer, does not contain groups as illustrated below which are reactive with isocyanato groups under typical storage and shipping temperatures, etc. In general, however, many flow modifiers suitable in the practice of the invention have molecular weights in the range of from about 135 to about 1000, desirably from about 150 to about 750. The flow modifiers are characterized by the absence of groups which are normally reactive with an isocyanato group (—NCO) at typical storage and shipping temperatures such as hydroxyl, carboxyl, thiol, primary amino, secondary amino, and the like.

Various subclasses of flow modifiers which are suitable in the practice of the invention(s) are represented by the structural formulas infra. A preferred subclass is shown below as formula (I):

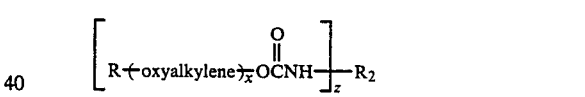

wherein the oxyalkylene group generally contains from 2 to 4 carbon atoms in the oxyalkylene chain; wherein each R individually represents a monovalent acyclic, alicyclic or aromatic group; wherein x is at least one and upwards to 25, and more, but generally 1 to 8; wherein z is from 1 to 5, preferably 2 to 3; and wherein $R_2$ represents a monovalent acyclic, alicyclic or aromatic group when z is 1 or a polyvalent acyclic, alicyclic or aromatic group when z is 2 to 5. The maximum average number of $oxyC_2$–$C_3$alkylene units in the flow modifier of choice is realistically governed by the restriction that the flow modifier employed in the practice of the invention is a liquid or low melting solid which is compatible and soluble with the isocyanato-terminated prepolymer thus forming a mixture of the prepolymer and flow modifier which is a stable liquid at low temperatures for prolonged periods of time. Illustrative R groups include straight and branched alkyls, aralkyls, cycloalkyls, and the aryls (mono-, fused-, and bridged-aryls, and the partially hydrogenated aryls) such as methyl, ethyl, n-butyl, isobutyl, 2-ethylhexyl, lauryl, stearyl, oleyl, phenethyl, phenylpropyl, phenyl, tolyl, xylyl, benzyl, cyclopentyl, methylcyclohexyl, cyclohexyl, cyclohexylmethyl, cycloheptyl, and cyclohexenyl. Illustrative $R_2$ groups include alkyl, cycloalkyl, aryl, cycloalkyl, and the aryls illustrated previously as well as the corresponding higher polyvalent acyclic, alicyclic and aromatic groups, e.g., alkylene, cycloalkylne, arylene, and the like. Examples of $R_2$ groups include methyl, ethyl, n-butyl, phenethyl, 3-methoxyhexyl, xylyl, phenyl, mesityl, tolyl, indenyl, 2-methoxyphenyl, 4-biphenylyl, naphthyl, cyclohexyl, cyclopentyl, methylcyclohexyl, cycloheptyl, 1,4-butylene, 1,6-hexamethylene, cyclopentylene, cyclohexylene, cyclohexenylene, phenylene, 1,5-naphthylene, 1-methoxy-2,4-phenylene, 1-chloro-2,4-phenylene, hexahydronaphthylene, 4,4'-dicyclohexylenemethane, 1-propoxy-2,4-phenylene, xylylene, and tolylene. It is preferred that the foregoing acyclic groups contain no more than 17 carbon atoms (most preferably, no more than 10 carbon atoms), that the alicyclic groups contain from 5 to 7 carbon atoms in the ring nucleus and up to 2 carbon atoms in any substituent bonded to the ri-g nucleus, and that the aromatic groups contain up to 12 carbon atoms and one or two benzenoid nucleus, and that z equals 2.

A particularly preferred subclass of flow modifiers embraced within Formula I supra is shown below:

wherein each R' individually is $C_1$–$C_8$alkyl, $C_5$–$C_7$-cycloalkyl, methyl- or ethyl-substituted $C_5$–$C_7$cycloalkyl, or aryl-$C_1$–$C_3$alkyl; wherein A represents $C_1$–$C_8$alkylene, cyclohexylene, $C_1$–$C_2$alkyl- or $C_1$–$C_2$alkoxy-substituted cyclohexylene, unsubstituted, $C_1$–$C_3$alkyl-, or $C_1$–$C_3$alkoxy-substituted phenylene (preferably tolylene), or divalent (4,4'- and 4,4'-/4,2'-)diphenylmethane, or the divalent hydrogenated counterparts of the foregoing; wherein x is at least one and upwards to 25, and more, preferably 1 to 4; and wherein the oxy$C_2$-$C_3$alkylene unit is oxyethylene, oxypropylene, and mixed and/or block oxyethyleneoxypropylene unit(s), and mixtures of the foregoing.

The flow modifiers of Formulas I and IA are readily prepared by reacting monohydroxyl-terminated oxyalkylene compounds, e.g., R–(oxyalkylene)$_x$OH, with organic mono- or polyisocyanate compounds using an amount of the monohydroxyl compound sufficient to react with all the NCO groups present in the isocyanate compound. The monohydroxyl-terminated oxyalkylene compounds can be prepared by reacting a monofunctional initiator which contains an active hydrogen atom with an epoxide compound, the preferred initiator being a monohydric alcohol or a phenol and the preferred epoxide compound being the alkylene oxides such as ethylene oxide, propylene oxide, and mixtures thereof, in the presence of a base catalyst. Initiators and epoxide compounds are illustrated throughout the specification. Prior to reacting the resulting monohydroxyl-terminated polyether product with the isocyanate, it is preferred to remove the basic catalyst. These reactions are well documented in the art.

Illustrative mono- and polyisocyanates which can be employed in the OH/NCO reaction to form the flow modifiers of Formulas I and IA include aliphatic, alicyclic and aromatic isocyanates, such as phenyl isocyanate, the alkyl isocyanates such as butyl isocyanate; the polymethylenes diisocyanates such as hexamethylene diisocyanate; and the aromatic diisocyanates such as 2,4-/2,6-isomers of tolylene diisocyanate, 4,4'-diphenylmethane diisocyanate, 4,4'-dicyclohexylmethane diisocyanate. Others are described, for example, in the text by W. Siefken and Justus Liebigs Annalen der Chemie, 562, pages 75 to 136.

A second subclass of flow modifiers useful in the practice of the invention is represented by Formula II infra:

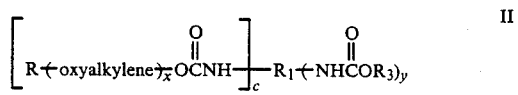

wherein R, x and oxyalkylene have the meanings or values assigned in Formula I supra, wherein $R_1$ is a polyvalent (generally a di-, tri- or tetravalent) acyclic, alicyclic, or aromatic group having the broad and preferred meanings assigned to polyvalent $R_2$ of Formula I supra, the valence of $R_1$ being equal to c plus y, wherein each $R_3$ individually is an acyclic, alicyclic or aromatic group, e.g., straight and branched alkyl, cycloalkyl, aryl, etc., as illustrated in Formula I with respect to the R group, wherein y has a value of 1 to 2, preferably one, and wherein c has a value of 1 to 2.

A preferred subclass of flow modifiers within the scope of Formula II are shown structurally in Formula IIA below:

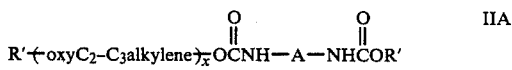

wherein R', A, x and oxy$C_2$–$C_3$alkylene have the meanings or values assigned in Formula IA supra.

The flow modifiers of Formulas II and IIA can be prepared by reacting monohydroxyl-terminated oxyalkylenecompounds, e.g., R–(oxyalkylene)$_x$OH, with an organic polyisocyanate having 2 to 4 —NCO groups, preferably 2 to 3 —NCO groups, at a 1:1 molar ratio of polyisocyanate to monohydroxyl compound, to form

which in turn is reacted with an excess of a monohydric alcohol or a phenol, or an admixture of same with R–(oxyalkylene)$_x$OH, to form the products of Formula II supra. Excess monohydric or phenolic compound can be removed via distillation or other means known to the art.

A third subclass of flow modifiers is exemplified by Formula III below:

wherein oxyalkylene has the meanings and values assigned in Formula I supra; wherein each $R_4$ individually is a monovalent acyclic, alicyclic, or aromatic group as exemplified in Formula I supra with respect to the R group and, additionally, each $R_4$ individually can be acyl, i.e.,

the R group of which has the meanings of the said R group of Formula I, and wherein x has the values assigned in Formula I supra.

A preferred subclass of flow modifiers within the scope of Formula III above is shown below in Formula IIIA:

$$R'+oxyC_2\text{-}C_3\text{alkylene})_xOR' \qquad \text{IIIA}$$

wherein each R', individually, and $oxyC_2\text{-}C_3$alkylene have the significance assigned in Formula IA above, and wherein x has a value of at least one, and preferably at least 2, and upwards to 5, and higher.

Another preferred subclass of the compounds within the scope of Formula III is:

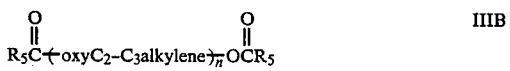

wherein $oxyC_2\text{-}C_3$alkylene has the significance stated in Formula IA above, wherein n is 2 to 4, and each $R_5$ individually is $C_1\text{-}C_{18}$alkyl such as methyl, ethyl, propyl, 2-ethylpentyl, stearyl, and oleyl; unsubstituted- and $C_1\text{-}C_2$alkyl-substituted $C_5\text{-}C_7$cycloalkyls; aralkyls such as aryl-$C_1\text{-}C_4$alkyls, benzyl, and phenethyl; cinnamyl; aryls, e.g., phenyl, tolyl, xylyl, naphthyl, methylnaphthyl, and the like.

A still further preferred subclass of liquid flow modifiers within the scope of Formula III is shown below:

wherein R', $R_5$, x and $oxyC_2\text{-}C_3$alkylene have the significance assigned in Formulas IIIA and IIIB above.

The flow modifiers of Formula III and the preferred subclasses can be prepared by conventional etherification and esterification reactions. For example, monohydroxyl-terminated or dihydroxyl-terminated oxyalkylene compounds, e.g., $R+oxyalkylene)_xOH$ or $H+oxyalkylene)_xOH$, can be reacted with an anhydride of a monocarboxylic acid, or the monocarboxylic acid per se, in an amount which is sufficient to react with all the hydroxyl groups. Typical anhydrides or acids include acetic anhydride, propionic anhydride, 2-ethylhexanoic acid, lauric acid, oleic acid, stearic acid, benzoic acid, cinnamic acid, naphthoic acid, and the like.

Illustrative compounds within the scope of Formula III above include the diesters of aliphatic and aromatic monocarboxylic acids with polyoxyalkylene glycols, for example, polyoxyethylene glycols and polyoxypropylene glycols, or mixed polyoxyethylene-oxypropylene glycols, or mixtures of these glycols. Preferred compounds are the diesters of diethylene glycol, of triethylene glycol and of tetraethylene glycol and hexanoic acid, 2-ethylhexanoic acid and benzoic acid. Highly further preferred compounds are the dibenzoyl diesters of diethylene glycol and of dipropylene glycol known by the Benzoflex mark of the Velsicol Chemical Corporation. Other preferred diester compounds include the diesters of tripropylene glycol and 2-ethylhexanoic acid or benzoic acid. Preferred diether flow modifiers can be illustrated by the lower dialkyl diethers of mono- and polyalkylene glycols, e.g., the dimethyl-, diethyl-, dipropyl-, dibutyl-, and di-2-ethylhexyl-diether of ethylene glycol, of propylene glycol, of butylene glycol, of diethylene glycol, of triethylene glycol, of tetraethylene glycol, of dipropylene glycol, of tripropylene glycol, and of the mono- and poly(oxyethyleneoxypropylene) copolyether glycols.

A fourth subclass of flow modifiers is structurally depicted in Formula IV below:

wherein R, x, and oxyalkylene have the values and meanings assigned in Formula I above.

A preferred subclass of the compounds of Formula IV is shown in Formula IVA infra:

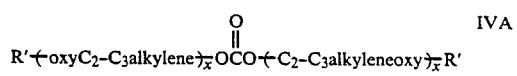

wherein R', x, and $oxyC_2\text{-}C_3$alkylene have the values and meanings assigned in Formula IA above.

The flow modifiers of Formulas IV and IVA are prepared by well-known prior art processes, for example, by reacting the monohydroxyl-terminated oxyalkylene compound, $R+oxyalkylene)_xOH$, with phosgene in the presence of a basic catalyst to form the carbonate product. Another method involves the ester interchange of ethyl carbonate, ethylene carbonate, or propylene carbonate with the monohydroxyl-terminated oxyalkylene compound, in the presence of an ester interchange catalyst, followed by removal of the by-product alcohol or diol via distillation or other means.

A fifth subclass of liquid flow modifiers include:

$$(R_4O)_mB+(oxyalkylene)_xOR_4]_p \qquad \text{V}$$

wherein each $R_4$, individually, has the significance of $R_4$ in Formula III above, wherein x and the oxyalkylene unit have the meanings and values assigned in Formula I supra, wherein m has a value of 0 to 8, wherein p has a value of 1 to 8, and wherein the sum of m and p (m+p) is 2 to 8, desirably 3 to 8, and wherein B is a polyvalent acyclic, alicyclic, or aromatic group composed of carbon (desirably up to 12 carbon atoms) and hydrogen atoms, and optionally etheric oxygen and/or amino nitrogen atoms. B represents the remainder of a polyfunctional initiator compound without any active hydrogen groups, e.g., hydroxyl, which polyfunctional initiator is characterized by its reactivity with an epoxide compound preferably $C_2\text{-}C_{10}$aliphatic and $C_5\text{-}C_7$-cycloaliphatic epoxides having a

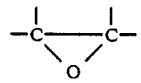

group. The valence of B is equal to the sum of m+p.

A preferred subclass of liquid flow modifiers encompassed within the metes and bounds of Formula V is structurally depicted below:

$(R_5O)_qD[(oxyC_2-C_3alkylene)_xOR_5]_r$     VA wherein each $R_5$ individually has the significance shown in Formula IIIB above and additionally can be $$\underset{R_5C-,}{\overset{O}{\underset{\|}{}}}$$

wherein q has a value of 0 to 5, wherein r has a value of 1 to 6, wherein the sum of q and r (q+r) is 3 to 6, wherein x has an average value of from 1 to about 3, wherein the $oxyC_2-C_3$alkylene group has the significance set out in Formula IA supra, and wherein D is a polyvalent group composed of carbon and hydrogen atoms and whose valence equals the sum of q+r.

The flow modifiers of Formulas V and VA including mixtures thereof are prepared by reactions well known in the art. For example, polyfunctional initiator compounds containing 3 to 8 hydroxyl groups are reacted with epoxide compounds, preferably vicinal epoxides, and the resulting hydroxyl-containing polyoxyalkylated products can be capped with an anhydride of a monocarboxylic acid or the monocarboxylic acid per se (ester termination) or capped with alkyl halide or alkyl sulfate (ether termination) according to well-known processes. Typical polyfunctional initiator compounds include, by way of illustrations, glycerol, 1,2,4-butanetriol, 1,2,6-hexanetriol, 1,1-trimethylolethane, 1,1-trimethylolpropane, erythritol, triethanolamine, mixtures thereof, and the like. Illustrative epoxides include ethylene oxide, propylene oxide, 1,2-butylene oxide, 2,3-butylene oxide, epichlorohydrin, 1,2-epoxycyclohexane, styrene oxide, tetrahydrofuran, mixtures thereof, and the like. Vicinal epoxides, i.e., epoxide compounds characterized by the

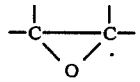

group, are preferred. Particularly preferred epoxides are ethylene oxide, propylene oxide, and mixtures thereof.

Another subclass of liquid flow modifiers useful in the practice of the invention includes:

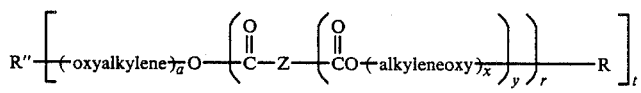     VI wherein R" is a monovalent or polyvalent acyclic, alicyclic, or aromatic group composed of carbon (desirably up to 12 carbon atoms) and hydrogen atoms, and optionally etheric oxygen and/or amino nitrogen atoms, and represents the remainder of a mono- or polyfunctional initiator compound without the active hydrogen group(s), e.g., hydroxyl(s), as discussed and illustrated in respect of Formulas V and VA supra, the valence of R" being equal to the value of t; wherein each R individually is a monovalent acyclic, alicyclic or aromatic group of the significance noted in Formula I supra; wherein oxyalkylene has the meanings assigned in Formula I supra; wherein x has the values assigned in Formula I supra; wherein a is zero or x; wherein y has a value of 1 to 3; wherein r has a value of 1 to 3; wherein t has a value of 1 to 5; and wherein Z is the remainder, excluding the carboxyl groups, of an acyclic, alicyclic or aromatic polycarboxylic acid, preferably 2 to 10 carbon atoms, and has a valence equal to y plus one (y+1).

Preferred liquid flow modifiers within the subclass designed as Formula VIA include:

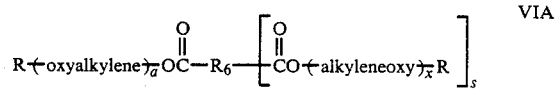     VIA wherein R, x and oxyalkylene have the meanings and values assigned in Formula I supra; wherein $R_6$ is a divalent or trivalent acyclic, alicyclic or aromatic group having the meanings of $R_2$ in Formula I supra when $R_2$ is divalent and trivalent; wherein a has a value of zero or x; and wherein s is 1 or 2.

Additional preferred flow modifiers falling within Formula VI are noted below:

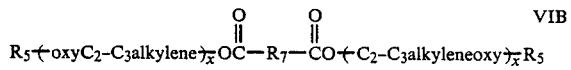     VIB wherein each $R_5$ individually has the significance assigned to $R_5$ in Formula IIIB supra, wherein x has the value assigned in Formula IA supra, wherein $C_2-C_3$alkyleneoxy has the meaning assigned in Formula IA supra, and wherein $R_7$ represents a divalent acyclic, alicyclic or aromatic group (the remainder of a dicarboxylic acid without the 2 carboxylic groups) having up to 10 carbon atoms.

The products of Formulas VI, VIA and VIB are easily prepared by well-known esterification techniques; see, for example, U.S. Pat. Nos. 3,502,601 and 3,882,072. For example, dicarboxylic acids or their anhydrides are preferably reacted with a monohydroxyl-terminated oxyalkylene compound(s), e.g., R-(-oxyalkylene)$_x$OH, or a mixture of such oxyalkylene compound and a monohydric alcohol, in amounts sufficient to produce the esterified products of Formula VI and VIA above. Excess hydroxyl reactant can be removed from the esterification product mixture by conventional techniques. Illustrative polycarboxylic acids or anhydrides useful in preparation of the above products are glutaric anhydride, maleic anhydride, o-phthalic anhydride, succinic acid, adipic acid, sebacic acid, phthalic acid, and the like.

A further subclass of flow modifiers include the formal acetal and ketal compounds of Formula VII infra:

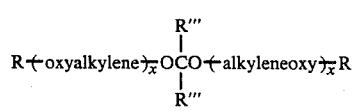     VII wherein each R, x, and oxyalkylene have the values and meanings assigned in Formula I supra, and wherein each R''' individually is hydrogen, a $C_1-C_8$alkyl, or a $C_5-C_7$cycloalkyl.

Preferred subclasses of formals, acetals and ketals include the compounds within Formula VIIA below:

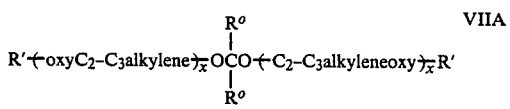

wherein R', x, and oxyC$_2$–C$_3$alkylene have the meanings and values assigned in Formula IA, and R° is hydrogen, methyl and ethyl.

Particularly desirably flow modifiers shown in Formula VII supra are the formals from formaldehyde, the acetals from acetaldehyde, and the ketals from acetone and methyl ethyl ketone, with monoalkyl ether glycols, such as the mono-C$_1$–C$_6$-alkyl ethers of ethylene glycol, of diethylene glycol, of triethylene glycol, of propylene glycol, of dipropylene glycol, and mixtures thereof. Preferred monoalkyl ether glycols include methoxyethanol, methoxypropanol, methoxyethoxyethanol (also called methoxydiglycol), methoxydipropylene glycol, ethoxyethanol, butoxyethanol, hexoxyethanol, ethoxydiglycol, butoxydiglycol, hexoxydiglycol, methoxytriglycol, ethoxytriglycol, butoxytriglycol, isopropoxypropylene glycol, butoxypropylene glycol, and butoxyethoxyisopropanol. Still other glycol ethers of considerable interest are the aryloxy glycols, for example, phenoxyethanol and phenoxydiglycol. The preparation of these compounds is documented in the literature; see, for example, U.S. Pat. No. 4,287,307.

It is also feasible to use as flow modifiers the acyloxy or alkoxy endblocked esterification products obtained by the esterification reaction of hydroxycarboxylic acid, e.g., 6-hydroxycaproic acid, lower oligomers thereof, lactones, e.g., epsilon-caprolactone, with glycols or higher polyols, including mixtures thereof; see U.S. Pat. Nos. 3,169,945; 3,666,724, and 3,957,753, the disclosures of which are incorporated by reference into this specification.

Highly preferred flow modifiers include the dipropylene glycol diester of benzoic acid having the formula

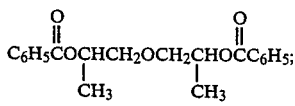

the triethylene glycol and tetraethylene glycol diesters of 2-ethylhexanoic acid having the formula

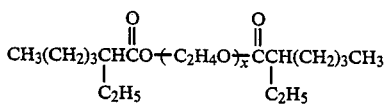

wherein x has a value of 3 to 4; the alkanedioic diesters of diethylene glycol monobutyl ether of the formula

wherein Y is propylene, butylene, octylene, and o-phenylene; the formal reaction product of formaldehyde and the monobutyl ether of diethylene glycol of the formula

C$_4$H$_9$OC$_2$H$_4$OC$_2$H$_4$OCH$_2$OC$_2$H$_4$OC$_2$H$_4$OC$_4$H$_9$;

and the urethane products resulting from the reaction of 2,4- and/or 2,6-toluene diisocyanate and monoether of mono- and polyC$_2$–C$_3$alkylene glycol of the formula

wherein R' is alkyl or aryl, preferably methyl, ethyl, propyl, isopropyl, butyl, isobutyl, sec-butyl, pentyl, hexyl and phenyl, and wherein x is at least one, preferably 2 to 4.

The prepolymer component of the novel low temperature, storage stable, liquid mixtures comprises the reaction product(s) of a diphenylmethane diisocyanate with linear and/or slightly branched chain polyetherpolyols. Suitable polyetherpolyols are those having hydroxyl equivalent weights in the range of from about 60 to about 2250, although polyesterpolyol outside this range can be used to produce useful urethane products. However, novel liquid mixtures comprising quasi-prepolymers from a diphenylmethane diisocyanate and polyetherdiol, and optionally, a small amount of higher polyetherpolyol(s) having hydroxyl equivalent weights between about 200 to about 2000 are most desirable in the manufacture of high performance microcellular urethane elastomers including integral skin microcellular urethane products. For instance, integral skin microcellular urethane articles, e.g., shoe soles, can be obtained which are characterized by a resilient core of substantially uniform density and an integrally formed, tough, substantially continuous surface skin surrounding said core, the boundary between said skin and said core being characterized by a rather abrupt change in density. The skin is itself flexible, essentially devoid of blemishes, impervious to oil and water, directly accepts paint without first requiring primers to its surface, and exhibits superior flex life, high tear strength, and generally superior abrasion resistance.

In the practice of preferred embodiments of the invention, there can be achieved liquid, compatible, low temperature, long-standing, storage stable solutions comprising prepolymer and flow modifier and outstanding urethane products therefrom, e.g., molded microcellular integral skin shoe soles, by utilizing prepolymers derived from a diphenylmethane diisocyanate and linear poyetherdiols and/or slightly branched higher polyetherpolyols which have hydroxyl equivalent weight in the range of from about 500 to about 1500, preferably from about 750 to about 1250, and most preferably approximately 1000. In general, the functionality (OH) of the polyetherpolyol is in the range of from 2 to about 3, desirably 2 to about 2.5, preferably 2 to about 2.2, and most preferably 2 to about 2.1.

The linear and branched chain polyetherpolyols can be prepared by processes well documented in the art as by reacting a hydroxylated functional compound such as C$_2$–C$_{10}$alkanediols, C$_3$–C$_{10}$alkanetriols, tetrols, etc., e.g., ethylene glycol, 1,4-butanediol, 1,2-propanediol, glycerol, trimethylolpropane, trimethylolethane, H$_2$O, and others, with an epoxide compound, preferably a vicinal epoxide characterized by the

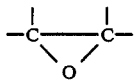

group, e.g., ethylene oxide, propylene oxide, 1,2-butylene oxide, 2,3-butylene oxide, styrene oxide, epichlorohydrin, 1,2-epoxycyclohexane, tetrahydrofuran, mixtures thereof, and the like. Preferred epoxies are propylene oxide, ethylene oxide, mixtures thereof with/without minor amounts of other epoxide compounds. Particularly preferred polyetherpolyols are characterized by oxypropylene units, oxypropyleneoxyethylene units, with/without partial capping of the polyetherpolyol with ethylene oxide to enhance the primary hydroxyl termination of the polyetherpolyol.

The polyisocyanate compound used in the preparation of the isocyanate-terminated prepolymer is characterized by a methylene group ($-CH_2-$), each valence of which is separately bonded to a carbon atom of a benzenoid nucleus such as a diphenylmethane diisocyanate (MDI), for example, 4,4'-diphenylmethane diisocyanate, 2,4'-diphenylmethane diisocyanate, mixtures of 4,4'-MDI and 2,4'-MDI, a liquid mixture of 4,4'-MDI and carbodiimides thereof, e.g., Isonate 143-L, mixtures of 4,4'-MDI and minor amount of the 2,4'- and 2,2'-MDI isomers, and the like. Desirably, the diisocyanate compound contains at least 75 wt. %, preferably at least 90 wt. % 4,4'-MDI, and a minor amount other MDI isomers or carbodiimides illustrated above or mixture thereof and the like. The isocyanate compound and polyetherpolyol are reacted in a ratio of NCO groups to OH group of at least about 2.5:1, but a more suitable range of NCO equivalents per OH equivalent is from about 2.7 to about 24 (NCO) to one (OH). A NCO/OH ratio in the range of from about 3.7:1 to about 12:1 is preferred with a most preferred ratio being from about 7 to about 12 NCO equivalents per one OH equivalent. The addition of the flow modifiers of the invention to the polyether prepolymers not only improves the low temperature stability of these prepolymers but very unexpectedly and surprisingly, indeed, also improves their chemical stability. It has been observed that the tendency towards the formation of insoluble isocyanate trimers and dimers under ambient storage conditions of from about 10° C.–30° C. is markedly reduced. Various mixtures of flow modifier and prepolymer have been observed to be clear after several months indicating a total absence of dimer and trimer formation.

A few parts, e.g., 2–3 parts, of flow modifier added to 100 parts of prepolymer can result in a compatible solution whose melting point is measurably lower than the prepolymer per se. In general, it is desirable to incorporate at least about 5 parts (by weight) of flow modifier into 100 parts (by weight) of prepolymer. Though in some instances 35 parts, and even more, of flow modifier per 100 parts of prepolymer can be admixed together to form low temperature, storage stable, compatible solutions, it is desirable to employ about 5 to about 30 parts, preferably from about 7 to about 25 parts, and preferably still from about 7 to about 20 parts, of flow modifier per 100 parts of prepolymer. The optimum commercial range will, to a large degree, depend on the choice of the flow modifier and prepolymer. One or more flow modifiers can be employed in the practice of the invention providing the resulting novel mixture is a normally-liquid, compatible mixture. Additional ingredients which do not contain hydrogen active with isocyanato groups, e.g., surfactant, blowing agent, dye, can be incorporated into the novel mixture; however, from a commercial standpoint such ingredients are generally included with the polyol component.

Inasmuch as a number of components employed in the practice of the invention have been identified by their trade names, for the sake of convenience, these are tabulated herein and their chemical structure or specifications further amplified so that any of these components can be readily obtainable or made by those of ordinary skill in the art. The components are marked with a double asterisk (**) in the Examples.

| TRADE NAME DESIGNATION TABLE | |
|---|---|
| Trade Designation | Identification of Component(s) and source of same |
| ISONATE PF Isocyanate | Mobay Chemical Corporation Polyurethane Division A clear yellow liquid isocyanato-terminated polyether prepolymer made by reacting about 85 weight percent diphenylmethane diisocyanate and 15 weight percent dipropylene glycol and tripropylene glycol. It has an isocyanate content of about 22.6% by weight and an isocyanate equivalent of about 186. |
| MONDUR MR Isocyanate | Mobay Chemical Corporation Polyurethane Division A crude polymethylene polyphenyl polyisocyanate having an isocyanate content of about 31.5% by weight and an isocyanate equivalent of about 133.4. |
| ISONATE 125M Isocyanate | The Upjohn Company A high-purity grade of diphenylmethane diisocyanate containing approximately 98% 4,4'-diphenylmethane diisocyanate and 2% 2,4'-diphenylmethane diisocyanate. The average isocyanate equivalent is 125. |
| BUTYL CARBITOL | Union Carbide Corporation |

TRADE NAME DESIGNATION TABLE -continued

| Trade Designation | Identification of Component(s) and source of same | |
|---|---|---|
| METHYL CARBITOL | Diethylene glycol monobutyl ether with a molecular weight of 162. Union Carbide Corporation Diethylene glycol monomethyl ether with a molecular weight of 120. | |
| UCON LUBRICANT 50HB660 | Union Carbide Corporation Monobutyl ether of oxyethylene-oxypropylene glycol having an average molecular weight of approximately 1700. | |
| TP-759 PLASTICIZER | Thiokol Corporation An ether-ester plasticizer exhibiting the following typical properties: | |
| | Specific Gravity @ 77° F. (25° C.) | 1.032 |
| | Refractive Index @ 77° F. (25° C.) | 1.142 |
| | Viscosity cps. @ 77° F. (25° C.) | 25 |
| | Moisture % | 0.2 |
| | Flash Point (ASTM-D-73-73) °F. (°C.) | 339° F. (170° C.) |
| | Fire Point (ASTM-D-73-73) °F. (°C.) | 409.6° F. (192° C.) |
| | Volatility % loss after 2 hrs. (ASTM-D-22-88) @ 311° F. (155° C.) | 0.72 |
| HALLCO C-504 | The C. P. Hall Company Dibutoxyethyl sebacate A high boiling plasticizer exhibiting the following typical properties: | |
| | Acid value, mg KOH/g | 2.0 |
| | Appearance | Clear, oily liquid |
| | Color, APHA | 70 |
| | Odor | Faint, characteristic |
| | Saponification Value, mg KOH/g | 278 |
| | Specific Gravity @ 25° C./25° C. | 0.967 |
| TP-90B Plasticizer | Thiokol Corporation Formal from Butyl Carbitol $C_4H_9(OC_2H_4)_2OH$ and formaldehyde. i.e., $C_4H_9(OC_2H_4)_2OCH_2O(C_2H_4O)_2C_4H_9$. | |
| TEGMER 804 Plasticizer | The C. P. Hall Company Tetraethylene Glycol Di(2-Ethylhexanoate) | |
| HALLCO C-311 | The C. P. Hall Company Butyl Cellosolve Laurate | |
| |  | |
| HALLCO C-325 | The C. P. Hall Company Butyl Cellosolve Oleate. | |

The following examples are illustrative of the invention but are not to be construed as to limiting the scope thereof in any manner.

EXAMPLES 1-15

Various flow modifiers were examined for compatibility with Mondur PF** (isocyanato-terminated prepolymer). Each flow modifier was tested at three concentrations by weight (90 parts isocyanate/10 parts flow modifier, 80 parts isocyanate/20 parts flow modifier and 70 parts isocyanate/30 parts flow modifier). The flow modifiers were predried using molecular sieves, Type 4A, from the Linde Division of Union Carbide Corporation. Karl Fischer tests (ASTM D-2849) for % $H_2O$ show no detectable levels of water.

The samples were prepared by weighing into a test tube

| | 90/10 | 80/20 | 70/30 |
|---|---|---|---|
| Flow Modifier (gms) | 1.5 | 3.0 | 4.5 |
| Isocyanate (gms) | 13.5 | 12.0 | 10.5 |

The test tubes were tightly capped and heated to 70° C. for 20-30 minutes. The samples were agitated by vigorous shaking while hot and observations with respect to miscibility at this temperature (70° C.) were made. The samples were cooled in a constant temperature bath to 25° C. for 4-6 hours and the observations at 25° C. were then made. Compatible mixtures were then further cooled in a constant temperature bath to 20° C., 15° C., 10° C., 5° C., 0° C., −5° C., and −10° C., respectively, and allowed to remain at each temperature for a minimum of 24 hours. Observations regarding separation, cloud point (the temperature when haze is first observed), and freezing point (the temperature when crystals are first observed) were made at each temperature interval. A 15 gram sample of Mondur PF was tested as a control. Hazy mixtures at 25° C. were subjected to further treatment as indicated in the footnotes of Table I. Mixtures which reacted or separated (at 25° C.) were not further tested. The data are set forth in Table I supra.

Mondur PF following the procedure described with respect to Examples 1-15 supra.

EXAMPLE 16

Preparation of Reaction Product A (Butyl Carbitol/TDI)

Butyl Carbitol** having a functionality of one was reacted at a stoichiometric ratio of 1 equivalent to 1 equivalent with tolylene diisocyanate (80%, 2,4- and 20% 2,6-tolylene diisocyanate) having a molecular weight of 174 and a functionality of 2. Starting at room temperature, about 22° C., a clean dry jar was charged

TABLE I

COMPATIBILITY AND FREEZE POINT DETERMINATION IN MONDUR PF

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| 1. | Dibutoxyethyl Adipate | 10 | YES | YES[1] | — | 10° C. | 0° C. |
|   |   | 20 | YES | SEPARATES[1,3] | 25° C. | >25° C. | N.T.[2] |
|   |   | 30 | YES | SEPARATES[1,3] | 25° C. | >25° C. | N.T.[2] |
| 2. | Dibutoxyethyl Phthalate | 10 | YES | YES[1] | — | 10° C. | 0° C. |
|   |   | 20 | YES | SEPARATES[1] | 25° C. | >25° C. | N.T.[2] |
|   |   | 30 | YES | SEPARATES[1] | 25° C. | >25° C. | N.T.[2] |
| 3. | Dibutoxyethyl Azelate | 10 | YES | YES[1,4] | — | <0° C. | <0° C. |
|   |   | 20 | Sl. HAZE | YES[1,4] | — | <0° C. | <0° C. |
|   |   | 30 | Sl. HAZE | HAZY[1,4] | — | >25° C. | <0° C. |
| 4. | Tetraethylene Glycol Dimethyl Ether | 10 | YES | YES[1] | — | N.N.[5] | 5° C. |
|   |   | 20 | YES | YES[1] | — | N.N.[5] | −5° C. |
|   |   | 30 | YES | YES[1] | — | N.N.[5] | −10° C. |
| 5. | TP-90B** Plasticizer | 10 | YES | YES[1] | — | N.N.[5] | 0° C. |
|   |   | 20 | YES | YES[1] | — | 5° C. | −5° C. |
|   |   | 30 | YES | YES[1] | — | N.N.[5] | −10° C. |
| 6. | TP-759** Plasticizer | 10 | YES | YES[1] | — | 5° C. | 0° C. |
|   |   | 20 | YES | YES[1] | — | N.N.[5] | 0° C. |
|   |   | 30 | YES | YES[1] | — | N.N.[5] | −10° C. |
| 7. | Triethylene Glycol Dihexanoate | 10 | YES | YES[1] | — | 10° C. | 0° C. |
|   |   | 20 | YES | YES[1] | — | N.N.[5] | −10° C. |
|   |   | 30 | YES | HAZY[1,3] | — | >25° C. | <−10° C. |
| 8. | Tetraethylene Glycol Di(2-Ethylhexanoate) | 10 | YES | YES[1] | — | 15° C. | 0° C. |
|   |   | 20 | YES | YES[1] | — | N.N.[5] | −5° C. |
|   |   | 30 | YES | YES[1] | — | 15° C. | <−10° C. |
| 9. | Dipropylene Glycol Dibenzoate | 10 | YES | YES[1,3] | — | 5° C. | 0° C. |
|   |   | 20 | YES | YES[1,3] | — | −10° C. | <−10° C. |
|   |   | 30 | YES | YES[1,3] | — | 0° C. | <−10° C. |
| 10. | HALLCO C-504** | 10 | Sl. HAZE | REACTION[1,3,4] | — | — | N.T.[2] |
|   |   | 20 | Sl. HAZE | REACTION[1,3,4] | — | — | N.T.[2] |
|   |   | 30 | Sl. HAZE | REACTION[1,3,4] | — | — | N.T.[2] |
| 11. | TEGMER 804** | 10 | YES | YES[1] | — | 5° C. | 0° C. |
|   |   | 20 | YES | YES[1] | — | 15° C. | −10° C. |
|   |   | 30 | YES | WHITE[1,3,4] | — | >25° C. | N.T.[2] |
| 12. | HALLCO C-311** | 10 | YES | YES[1,3,4] | — | <0° C. | <0° C. |
|   |   | 20 | YES | YES[1] | −5° C. | 10° C. | −10° C. |
|   |   | 30 | YES | YES[1] | 10° C. | 20° C. | −10° C. |
| 13. | Triethylene Glycol Dimethyl Ether | 10 | YES | YES[1] | — | N.N.[5] | 0° C. |
|   |   | 20 | YES | YES[1] | — | N.N.[5] | −5° C. |
|   |   | 30 | YES | YES[1] | — | N.N.[5] | <−10° C. |
| 14. | HALLCO C-325** | 10 | YES | YES[1,4] | — | 5° C. | 0° C. |
|   |   | 20 | YES | HAZY[1,4] | — | >25° C. | <0° C. |
|   |   | 30 | YES | HAZY[1,4] | — | >25° C. | <0° C. |
| 15. | MONDUR PF** Control | None | — | — | — | N.N.[5] | 10° C.[6] |

FOOTNOTES:
[1] Test tube heated to 70° C. for 20-30 minutes, the contents agitated by vigorous shaking, and then allowed to cool to 25° C. and maintained thereat for 4-6 hours. Compatible mixtures were further cooled as stated previously.
[2] Not tested.
[3] Test tube was reheated to 80° C., contents were reagitated and held at 80° C. for one hour, and then allowed to cool to 22° C. for at least 4-6 hours.
[4] Test tube was reheated to 80° C., contents were reagitated and held at 80° C. for 16 hours, and then allowed to cool for at least 16 hours.
[5] None noticed.
[6] After 16 hours about half solid mass.
**See Trade Name Designation Table supra.

EXAMPLES 16-21

A series of flow modifiers designated, for convenience, as Reaction Product A, B, C, D, and E, were prepared by reacting a diisocyanate with an ether alcohol. The resulting isocyanate-ether alcohol reaction products were then examined for compatibility with with 32.5 gms of Butyl Carbitol and to this 17.4 gms of tolylene diisocyanate was added. The jar was capped tightly and agitated by gentle shaking to mix components. No heat was applied for the first 10 minutes. The resulting exotherm of this reaction raised the temperature to 55° C. At this point, additional heating was used. The jar was placed in a hot air oven and maintained for 3 hours at 70° C. to complete the reaction. After allowing the reaction product to cool to room temperature overnight, the following observations were made. The reaction product (Reaction Product A) was a slightly viscous, clear liquid with a dark yellow color.

EXAMPLE 17

Preparation of Reaction Product B (Methyl Carbitol/TDI)

Methyl Carbitol** (29.0 gms) having a functionality of one was reacted with 21.0 gms of the 2,4- 2,6-tolylene diisocyanate as described in Example 16 supra. After 10 minutes the exotherm of this reaction had increased the temperature of the mixture to 60° C. The reaction mixture was heated for 3 hours at 70° C. and cooled overnight to room temperature as in Example 16. The reaction product (Reaction Product B) was a transparent dark yellow viscous liquid.

EXAMPLE 18

Preparation of Reaction Product C (Butyl Carbitol/Isonate 125M)

Butyl Carbitol (405.6 gms) was charged to a 1-liter reaction flask fitted with a stirrer, thermometer, reflux condenser, feed inlet and nitrogen atmosphere. The internal temperature of the reaction flask was raised as necessary by heating the outside of the flask with a heat mantle controlled by a rheostat. The Butyl Carbitol was preheated to 94° C. Isonate 125M (high purity, 4,4'-MDI) was added in three increments with good agitation. The first add of the 4,4'-MDI (125.7 gms) brought the temperature of the mixture to 139° C. within 5 minutes. This being an exothermic reaction, the reaction product mixture was allowed to cool to 62° C. before the second 4,4'-MDI add of 127.7 gms was made. After 20 minutes a temperature of 94° C. was recorded and the third 4,4'-MDI addition of 59.2 gms was made. The total amount of ISONATE 125M added was 312.6 gms. With moderate heating a temperature of 92° C. to 118° C. was maintained for 2 hours to complete the reaction. Agitation was maintained throughout the entire procedure. At room temperature the reaction product (Reaction Product C) was a very viscous liquid with large crystals forming. At 35° C. it was a hazy liquid with a viscosity of 12,620 centipoises. At temperatures above 95° C. it is a clear light yellow liquid.

EXAMPLE 19

Preparation of Reaction Product D (Butyl Carbitol/Mondur MR)

Butyl Carbitol (405.6 gms) was charged to a 1-liter flask equipped as described in Example 17. The Butyl Carbitol was preheated to 82° C. and under agitation Mondur MR was added in three increments. The exotherm from the first addition of 144.1 gms of the isocyanate raised the temperature to 120° C. within 10 minutes. A second addition of 109.7 gms of the isocyanate was made when the temperature subsided to 92° C. and after 20 minutes a peak temperature of 109° C. was noted. The third increment of 79.7 gms of the isocyanate was added at 99.5° C. Moderate heating and continued agitation was used to maintain the temperature between 99° C. and 107° C. for 2 hours to complete the reaction. The resulting product (Reaction Product D) was a dark brown liquid with a viscosity of 342,8000 centipoises at 23° C. and 66,400 centipoises at 35° C. Although the color was very dark it was transparent with no solids evident.

EXAMPLE 20

Preparation of Reaction Product E (Ucon Lubricant 50HB550/TDI)

In a manner similar to the preceeding Examples and using the appropriate equivalents (1:1) of UCON 50HB660** and 2,4-/2,6-tolylene diisocyanate, there was prepared Reaction Product E, a clear liquid at room temperature.

Reaction Products A, B, C, D, and E were examined as flow modifiers for Mondur PF in the manner described with respect to Examples 1–15 supra. The data are set forth in Table II infra.

TABLE II

COMPATIBILITY AND FREEZE POINT DETERMINATION IN MONDUR PF

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| 16. | Reaction Product A (Butyl Carbitol/TDI) | 10 | YES | YES[1] | — | N.N.[2] | 5° C. |
|  |  | 20 | YES | YES[1] | — | N.N.[2] | 0° C. |
|  |  | 30 | YES | YES[1] | 5° C. | N.N.[2] | 0° C. |
| 17. | Reaction Product B (Methyl Carbitol/TDI) | 10 | YES | YES[1] | — | N.N.[2] | 5° C. |
|  |  | 20 | YES | YES[1] | — | 5° C. | 5° C. |
|  |  | 30 | YES | YES[1] | 20° C. | 20° C. | 0° C. |
| 18. | Reaction Product C (Butyl Carbitol/Isonate 125 M) | 10 | YES | YES[1] | — | N.N.[2] | 5° C. |
|  |  | 20 | YES | YES[1,3] | — | 20° C. | 5° C. |
|  |  | 30 | YES | Sl. HAZY[1,3] | 0° C. | 25° C. | 0° C. |
| 19. | Reaction Product D (Butyl Carbitol/Mondur MR) | 10 | YES | YES[1] | — | 15° C. | 5° C. |
|  |  | 20 | YES | YES[1] | — | 5° C. | 5° C. |
|  |  | 30 | YES | YES[1] | — | 5° C. | 0° C. |
| 20. | Reaction Product E (UCON 50HB660/TDI) | 10 | YES | YES[1] | — | N.N.[2] | 10° C. |
|  |  | 20 | YES | YES[1] | — | 5° C. | 5° C. |
|  |  | 30 | YES | YES[1] | — | N.N.[2] | 0° C. |
| 21. | MONDUR PF** | NONE | — | — | — | N.N.[2] | 10° C.[4] |

TABLE II-continued

| | | COMPATIBILITY AND FREEZE POINT DETERMINATION IN MONDUR PF | | | | |
|---|---|---|---|---|---|---|
| | | CONCENTRATION | COMPATIBILITY | | SEPARATION | CLOUD | FREEZE |
| No. | FLOW MODIFIER | BY WEIGHT | @ 70° C. | @ 25° C. | POINT, °C. | POINT, °C. | POINT, °C. |
| | Control | | | | | | |

[1] See footnote (1) of Table I.
[2] None noticed.
[3] See footnote (3) of Table I.
[4] See footnote (6) of Table I.

What is claimed is:

1. A stable, compatible liquid mixture which does not phase separate when stored for several days at temperatures substantially below normal room temperature consisting essentially of:
   (a) an isocyanato-containing prepolymer obtained from the reaction of (i) a diphenylmethane diisocyanate and (ii) linear or slightly branched polyetherpolyols having hydroxyl equivalent weights of from about 60 to about 2250 and an average hydroxyl functionality of from 2 to about 3, said diisocyanate and said polyetherpolyol being used in such quantities so as to provide at least about 2.5 NCO equivalents per OH equivalent, and
   (b) from about 3 to about 35 parts by weight, per 100 parts by weight of said prepolymer, of a non-hydroxyl flow modifier, said flow modifier having the following characteristics: (i) a boiling point above about 150° C., (ii) normally-liquid at 20° C. or relatively low melting solid which forms a compatible liquid mixture with said prepolymer, (iii) an average molecular weight of from about 100 to approximately 3000, and (iv) consisting essentially of carbon and hydrogen atoms in the form of monovalent or polyvalent hydrocarbon groups or mixtures of such groups; etheric oxygen in the form of oxyalkylene, all terminal oxyalkylene groups being satisfied by acyclic, alicyclic or aromatic groups which are monovalently bonded to the oxy moiety of the terminal oxyalkylene groups; and at least one group having the following structural configuration;

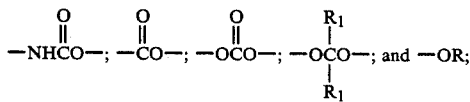

each $R_1$, individually, being hydrogen or a monovalent hydrocarbon group, and R being a hydrocarbyl group; and wherein each of the unsatisfied bonds of the above structural units are monovalently bonded to separate carbon atoms of the flow modifier molecule, said flow modifier being further characterized by the absence of groups which are normally reactive with an isocyanato group.

2. The liquid mixture of claim 1 wherein:
   (a) said polyetherpolyols have hydroxyl equivalent weights of from about 200 to about 2000;
   (b) said flow modifier is characterized by (i) at least one group consisting of oxyethylene, oxypropylene and mixtures thereof, and (ii) an average molecular weight of from about 135 to about 1000; and
   (c) said liquid mixture contains from about 5 to about 30 parts of said flow modifier per 100 parts of said prepolymer.

3. The liquid mixture of claim 2 wherein:
   (a) said isocyanato-containing prepolymer is obtained from the reaction of (i) a diphenylmethane diisocyanate and (ii) linear or slightly branched polyetherpolyols which have hydroxyl equivalent weights of from about 500 to about 1500 and an average hydroxyl functonality of from about 2 to about 2.5; said diisocyanate and said polyetherpolyol being used in such quantities so as to provide from about 2.7 to about 24 NCO equivalents per OH equivalent,
   (b) said non-hydroxy flow modifier has an average molecular weight of about 150 to about 750, and
   (c) said liquid mixture contains from about 7 parts to about 25 parts of said flow modifier per 100 parts of said prepolymer.

4. The liquid mixture of claim 2 wherein said flow modifier is of the group consisting of compounds of the following seven formulas:

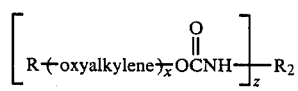

wherein the oxyalkylene group contains from 2 to 4 carbon atoms in the oxyalkylene chain;
wherein each R individually is of the group consisting of a monovalent acyclic group containing up to 17 carbon atoms, a monovalent alicyclic group containing from 5 to 7 carbon atoms in the alicyclic nucleus and up to 2 carbon atoms in any substituent monovalently bonded to the alicyclic nucleus, and a monovalent aromatic group containing 1 to 2 benzenoid nuclei;
wherein x has a value of at least 1;
wherein z has a value of 1 to 5; and
wherein $R_2$ is of the group consisting of an acyclic group containing up to 17 carbon atoms, an alicyclic group containing from 5 to 7 carbon atoms in the alicyclic nucleus and up to 2 carbon atoms in any substituent monovalently bonded to the alicyclic nucleus, and an aromatic group containing up to 12 carbon atoms and from 1 to 2 benzenoid nuclei, the valence of $R_2$ being equal to the value of z;

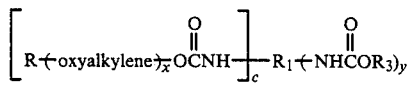

wherein R, x and the oxyalklene group have the meanings assigned in Formula I supra;
wherein $R_1$ is an acyclic, alicyclic, or aromatic group having the meanings assigned to $R_2$ in Formula I supra, with the proviso that the valence of $R_1$ is equal to the sum of c plus y;
wherein each $R_3$ individually has the meanings assigned to R of Formula I supra;

wherein y has a value of 1 to 2; and
wherein c has a value of 1 to 2;

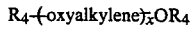   III wherein x and the oxyalkylene group have the meanings assigned in Formula I supra; and
wherein each $R_4$ individually is of the group consisting of acyl and the meanings assigned to R in Formula I supra;

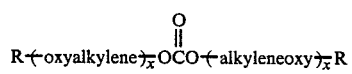   IV wherein R, x and the oxyalkylene group have the meanings assigned in Formula I supra;

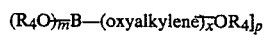   V wherein each $R_4$ individually has the meanings assigned in Formula III supra;
wherein x and the oxyalkylene group have the meanings assigned in Formula I supra;
wherein m has a value of 0 to 8;
wherein p has a value of 1 to 8;
wherein m plus p is 2 to 8; and
wherein B is a polyvalent acyclic, alicyclic or aromatic group and represents the remainder of a polyfunctional initiator compound without the active hydrogen groups and is composed of up to 12 carbon atoms, hydrogen, and optionally etheric oxygen, the valence of B being equal of m plus p;

wherein R, x and the oxyalkylene group have the meanings in Formula I supra; and
wherein each R''' individually is hydrogen, a $C_1$-$C_8$alkyl or a $C_5$-$C_7$cycloalkyl.

5. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula I.

6. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula II.

7. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula III.

8. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula IV.

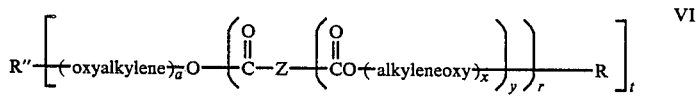   VI wherein R'' is a monovalent or polyvalent acyclic, alicyclic or aromatic group and represents the remainder of a functional initiator compound without the active hydrogen groups and is composed of up to 18 carbon atoms, hydrogen, and optionally etheric oxygen, the valence of R'' being equal to the value of t;
wherein R is a monovalent group having the meanings in Formula I supra;
wherein x is at least 1 and upwards to 8;
wherein a is zero or x;
wherein y has a value of 1 to 3;
wherein r has a value of 1 to 3;
wherein t has a value of 1 to 5; and
wherein Z is the remainder, excluding the carboxyl groups of an acyclic, alicyclic or aromatic polycarboxylic acid of 2 to 10 carbon atoms, and having a valence equal to y+1;

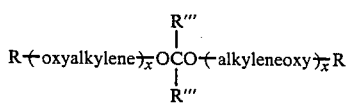   VII

9. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula V.

10. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula VII.

11. The liquid mixture of claim 4 which is stable at a temperature of about 5° C. for at least 100 hours and wherein (a) said prepolymer is obtained from the reaction of (i) a diphenylmethane diisocyanate containing at least 75 weight percent of the 4,4'-isomer and (ii) the said polyetherpolyol; and wherein (b) said flow modifier is represented by Formula VII.

12. The compatible liquid mixture of claim 3 which is stable and liquid at a temperature of about 5° C. for at least about one week wherein:
(a) said flow modifier conforms to the following formula:

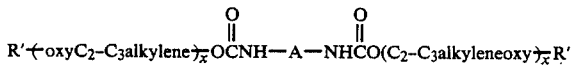

wherein each R' is $C_1$–$C_8$alkyl, a $C_5$–$C_7$cycloalkyl, or aryl-$C_1$–$C_3$alkyl, wherein A is $C_1$–$C_8$alkylene, a cyclohexylene, or a phenylene, and wherein each x has a value of 1 to 25; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

13. The compatible liquid mixture of claim 3 which is stable and liquid at a temperature of about 5° C. for at least about one week wherein:

(a) said flow modifier conforms to the following formula:

wherein each R' individually is $C_1$–$C_8$alkyl, a $C_5$–$C_7$cycloalkyl, or aryl-$C_1$–$C_3$alkyl, wherein A is $C_1$–$C_8$alkylene, a cyclohexylene, or a phenylene, and wherein each x has a value of 1 to 4; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

14. The compatible liquid mixture of claim 3 which is stable and liquid at a temperature of about 5° C. for at least about one week wherein:

(a) said flow modifier conforms to the following formula:

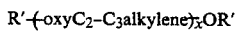

wherein each R' individually is $C_1$–$C_8$alkyl, a $C_5$–$C_7$cycloalkyl, or aryl-$C_1$–$C_3$alkyl, and wherein x has a value of 2 to 5; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

15. The compatible liquid mixture of claim 3 which is stable and liquid at a temperature of about 5° C. for at least about one week wherein:

(a) said flow modifier conforms to the following formula:

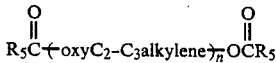

wherein each $R_5$ individually is $C_1$–$C_8$ alkyl, a $C_5$–$C_7$cycloalkyl, aryl-$C_1$–$C_4$alkyl, or aryl, and wherein n is 2 to 4; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

16. The compatible liquid mixture of claim 3 which is stable and liquid at a temperature of about 5° C. for at least about one week wherein:

(a) said flow modifier conforms to the following formula:

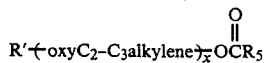

wherein R' is $C_1$–$C_8$alkyl, a $C_5$–$C_7$cycloalkyl, or aryl-$C_1$–$C_3$alkyl, wherein x is 2 to 5, and wherein $R_5$ is $C_1$–$C_{18}$alkyl, a $C_5$–$C_7$cycloalkyl, aryl-$C_1$–$C_4$alkyl, or aryl; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent 17. The compatible liquid mixture of claim 3 which is stable and liquid at a temperature of about 5° C. for at least about one week wherein:

(a) said flow modifier conforms to the following formula:

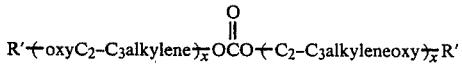

wherein each R' individually is $C_1$–$C_8$cycloalkyl, a $C_5$–$C_7$cycloalkyl, or aryl-$C_1$–$C_3$alkyl, and wherein each x is 1 to 4; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

18. The compatible liquid mixture of claim 3 which is stable and liquid at a temperature of about 5° C. for at least about one week wherein:

(a) said flow modifier conforms to the following formula:

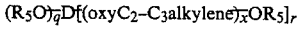

wherein each $R_5$ individually is $C_1$–$C_{18}$alkyl, a $C_5$–$C_7$cycloalkyl, aryl-$C_1$–$C_4$alkyl, aryl, or

the R₅ moiety of

having the aforesaid meanings, wherein q has a value of 0 to 5, wherein r has a value of 1 to 6, wherein the sum of q+r equals 3 to 6, wherein x has an average value of 1 to about 3, and wherein D is a polyvalent acyclic, alicyclic or aromatic group and represents the remainder of a polyfunctional initiator compound without the active hydrogen groups and is composed of hydrogen and up to 12 carbon atoms, the valence of D being equal to q+r; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

19. The compatible liquid mixture of claim 3 which is stable and liquid at a temperature of about 5° C. for at least about one week wherein:

(a) said flow modifier conforms to the following formula:

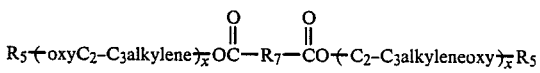

wherein each R₅ individually is C₁-C₁₈alkyl, a C₅-C₇cycloalkyl, aryl-C₁-C₄alkyl, or aryl, wherein R₇ represents the remainder of a dicarboxylic acid having up to 10 carbon atoms and lacking the two carboxyl groups, and wherein x is 1 to 4; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

20. The compatible liquid mixture of claim 3 which is stable and liquid at a temperature of about 5° C. for at least about one week wherein:

(a) said flow modifier conforms to the following formula:

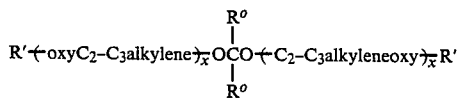

wherein each R° individually is hydrogen, methyl, or ethyl, wherein each R' individually is C₁-C₈cycloalkyl, a C₅-C₇cycloalkyl, or aryl-C₁-C₃alkyl, and wherein each x is 1 to 4; and (b) said prepolymer is obtained by the reaction of a diphenylmethane diisocyanate which contains at least 75 weight percent of the 4,4'-isomer and the polyetherpolyol, the quantities of said diisocyanate and said polyetherpolyol being sufficient to provide from about 3.7 to about 12 NCO equivalents per OH equivalent.

21. The compatible liquid mixture of claim 7 which is stable and liquid at about 5° C. for at least about one week (a) wherein said flow modifier has the following formula:

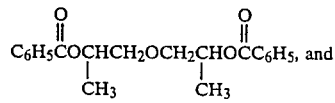

(b) wherein said prepolymer are the products of the reaction of (i) a diphenylmethane diisocyanate and (ii) linear or slightly branched polyetherpolyols having hydroxyl equivalent weights of from about 750 to about 1250 and an average hydroxyl functionality of from 2 to about 2.2, the amounts of said diisocyanate and said polyetherpolyol used in the reaction providing from about 7 to about 12 NCO equivalents per OH equivalent.

22. The compatible liquid mixture of claim 7 which is stable and liquid at about 5° C. for at least about one week (a) wherein said flow modifier has the following formula:

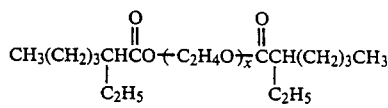

wherein x has a value of 3 to 4, and (b) wherein said prepolymers are the products of the reaction of (i) a diphenylmethane diisocyanate and (ii) linear or slightly branched polyetherpolyols having hydroxyl equivalent weights of from about 750 to about 1250 and an average hydroxyl functionality of from 2 to about 2.2, the amounts of said diisocyanate and said polyetherpolyol used in the reaction providing from about 7 to about 12 NCO equivalents per OH equivalent.

23. The compatible liquid mixture of claim 10 which is stable and liquid at about 5° C. for at least about one week (a) wherein said flow modifier has the following formula:

wherein Y is propylene, butylene, octylene, or ortho-phenylene, and (b) wherein said prepolymers are the products of the reaction of (i) a diphenylmethane diisocyanate and (ii) linear or slightly branched polyetherpolyols having hydroxyl equivalent weights of from about 750 to about 1250 and an average hydroxyl functionality of from 2 to about 2.2, the amounts of said diisocyanate and said polyetherpolyol used in the reaction providing from about 7 to about 12 NCO equivalents per OH equivalent.

24. The compatible liquid mixture of claim 11 which is stable and liquid at about 5° C. for at least about one week (a) wherein said flow modifier has the following formula:

$C_4H_9OC_2H_4OC_2H_4OCH_2OC_2H_4OC_2H_4OC_4H_9$, and (b) wherein said prepolymers are the products of the reaction of (i) a diphenylmethane diisocyanate and (ii) linear or slightly branched polyetherpolyols having hydroxyl equivalent weights of from about 750 to about 1250 and an average hydroxyl functionality of from 2 to about 2.2, the amounts of said diisocyanate and said polyetherpolyol used in the reaction providing from about 7 to about 12 NCO equivalents per OH equivalent.

25. The compatible liquid mixture of claim 5 which is stable and liquid at about 5° C. for at least about one week (a) wherein said flow modifier has the following formula:

$$[R'\text{+}oxyC_2\text{-}C_3\text{alkylene}\frac{}{}_{x}O\overset{O}{\overset{\|}{C}}NH\frac{}{}_{2}]\ 2,4\text{-and/or } 2,6\text{-tolylene}$$

wherein R' is $C_1$–$C_6$alkyl or phenyl, and wherein x is at least 1, and (b) wherein said prepolymers are the products of the reaction of (i) a diphenylmethane diisocyanate and (ii) linear or slightly branched polyetherpolyols having hydroxyl equivalent weights of from about 750 to about 1250 and an average hydroxyl functionality of from 2 to about 2.2, the amounts of said diisocyanate and said polyetherpolyol used in the reaction providing from about 7 to about 12 NCO equivalents per OH equivalent.

26. The compatible liquid mixture of claim 25 wherein the variables of the flow modifier have the following significance:

R' represents methyl, x equals 2, and the oxy-$C_2$-$C_3$alkylene group is oxyethylene.

27. The compatible liquid mixture of claim 25 wherein the variables of the flow modifier have the following significance:

R' represents butyl, x equals 2, and the oxy-$C_2$-$C_3$alkylene group is oxyethylene.

28. The compatible liquid mixture of claim 25 wherein the variables of the flow modifier have the following significance:

R' represents hexyl, x equals 2, and the oxy-$C_2$-$C_3$alkylene group is oxyethylene.

29. The compatible liquid mixture of claim 25 wherein the variables of the flow modifier have the following significance:

R' represents butyl, x equals 1, and the oxy-$C_2$-$C_3$alkylene group is oxypropylene.

30. The compatible liquid mixture of claim 25 wherein the variables of the flow modifer have the following significance:

R' represents propyl, x equals 1, and the oxy-$C_2$-$C_3$alkylene group is oxypropylene.

31. The compatible liquid mixture of claim 25 wherein the variables of the flow modifier have the following significance:

R' represents phenyl, x equals 1 or 2, and the oxy-$C_2$-$C_3$alkylene group is oxyethylene.

* * * * *